United States Patent [19]

Lee et al.

[11] Patent Number: 5,576,767
[45] Date of Patent: Nov. 19, 1996

[54] INTERFRAME VIDEO ENCODING AND DECODING SYSTEM

[75] Inventors: Chong U. Lee; Donald Pian, both of San Diego, Calif.

[73] Assignee: Qualcomm Incorporated, San Diego, Calif.

[21] Appl. No.: 532,042

[22] Filed: Sep. 21, 1995

Related U.S. Application Data

[63] Continuation of Ser. No. 407,427, Mar. 17, 1995, abandoned, which is a continuation of Ser. No. 12,814, Feb. 3, 1993, abandoned.

[51] Int. Cl.$^6$ .................................................... H04N 7/32
[52] U.S. Cl. ................................................ 348/413; 348/416
[58] Field of Search .................................... 348/402, 409, 348/412, 413, 415, 416, 699, 407

[56] References Cited

U.S. PATENT DOCUMENTS

| | | | |
|---|---|---|---|
| 4,179,709 | 12/1979 | Workman | 358/133 |
| 4,293,920 | 10/1981 | Merola | 364/725 |
| 4,504,860 | 3/1985 | Nicol et al. | 358/133 |
| 4,774,574 | 9/1988 | Daly et al. | 358/133 |
| 4,776,030 | 10/1988 | Tzou | 382/56 |
| 4,796,087 | 1/1989 | Guichard et al. | 348/402 |
| 4,807,042 | 2/1989 | Tanaka | 358/260 |
| 4,816,906 | 3/1989 | Kummerfeldt et al. | 348/402 |
| 4,821,119 | 4/1989 | Gharavi | 348/402 |
| 4,922,341 | 5/1990 | Strobach | 358/136 |
| 4,924,309 | 5/1990 | Hartnack et al. | 358/133 |
| 4,984,076 | 1/1991 | Watanabe et al. | 358/133 |
| 5,021,891 | 6/1991 | Lee | 358/432 |
| 5,045,938 | 9/1991 | Sugiyama | 358/133 |
| 5,073,820 | 12/1991 | Nakagawa et al. | 358/133 |
| 5,107,345 | 4/1992 | Lee | 358/432 |
| 5,126,857 | 6/1992 | Watanabe et al. | 358/433 |
| 5,151,784 | 9/1992 | LaVagetto et al. | 348/416 |
| 5,235,419 | 8/1993 | Krause | 348/416 |

OTHER PUBLICATIONS

Dinstein et al. "Variable Block–Size Transform Image Coder," *IEEE Transactions on Comm.*, pp. 2073–2078, Nov. 1990.
Reininger et al. "Distributions of the Two–Dimensional DCT Coefficients for Images," *IEEE Transactions on Comm.*, pp. 835–839, Jun. 1983.
Ahmed et al. "Discrete Cosine Transform," *IEEE Transactions on Computers*, pp. 90–93, Jan. 1973.
Comstock et al. "Hamming Coding of DCT–Compressed Images Over Noisy Channels," *IEEE Transactions on Comm.*, pp. 856–861, Jul. 1984.

(List continued on next page.)

*Primary Examiner*—Tommy P. Chin
*Assistant Examiner*—A. Au
*Attorney, Agent, or Firm*—Russell B. Miller; Sean English

[57] ABSTRACT

A video compression system and method for compressing video data for transmission or storage by reducing the temporal redundancy in the video data is described. A frame of video data is divided into a variable number of blocks of pixel data of varying size, and each block of data is compared to a window of pixel data in a reference frame of pixel data, typically the previous frame. A best matched block of pixel data is selected from the window of pixel data in the reference frame, and a displacement vector is assigned to describe the selected block location in the reference frame relative to the current block of pixel data. The number and size of the blocks of pixel data are permitted to vary, in order to adapt to motion discontinuities in the sequential frames of pixel data. This is to allow prediction blocks of pixel data in the current frame to be smaller in areas of high activity, while maintaining high levels of compression, achieved by using larger prediction blocks, in areas of the frame with low levels of activity. A frame of predicted pixel data is assembled from variable size blocks of prediction data and subtracted from the current frame of pixel data. Only the residual difference, the displacement vectors and an indication of the block sizes used in the prediction are needed for transmission or storage.

24 Claims, 6 Drawing Sheets

OTHER PUBLICATIONS

Roese et al. "Interframe Cosine Transform Image Coding," *IEEE Transactions on Comm.*, pp. 1329–1339, Nov. 1977.

Chen et al. "Adaptive Coding of Monochrome and Color Images," *IEEE Transactions on Comm.*, pp. 1285–1292, Nov. 1977.

Chen et al. "Scene Adaptive Coder," *IEEE Transactions on Comm.*, pp. 225–232, Mar. 1984.

Strobach, Peter. "Quadtree–Structured Recursive Plane Decomposition Coding of Images," *IEEE Transactions on Comm.*, pp. 1380–1397, Jun. 1991.

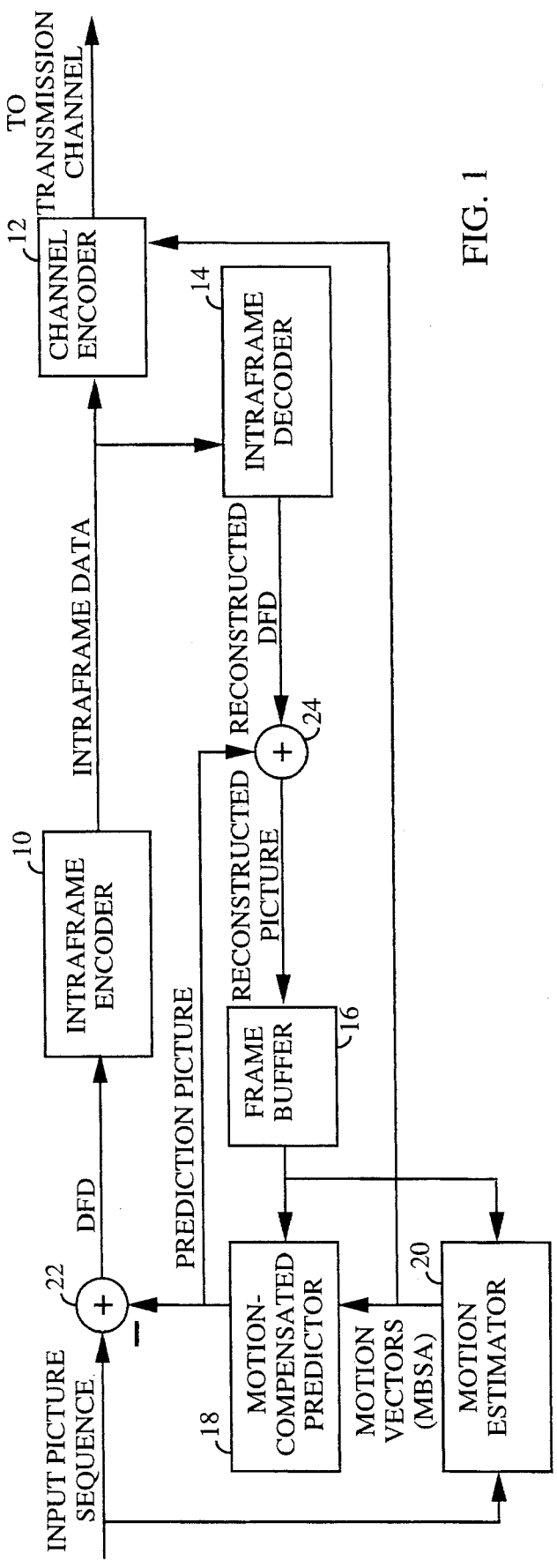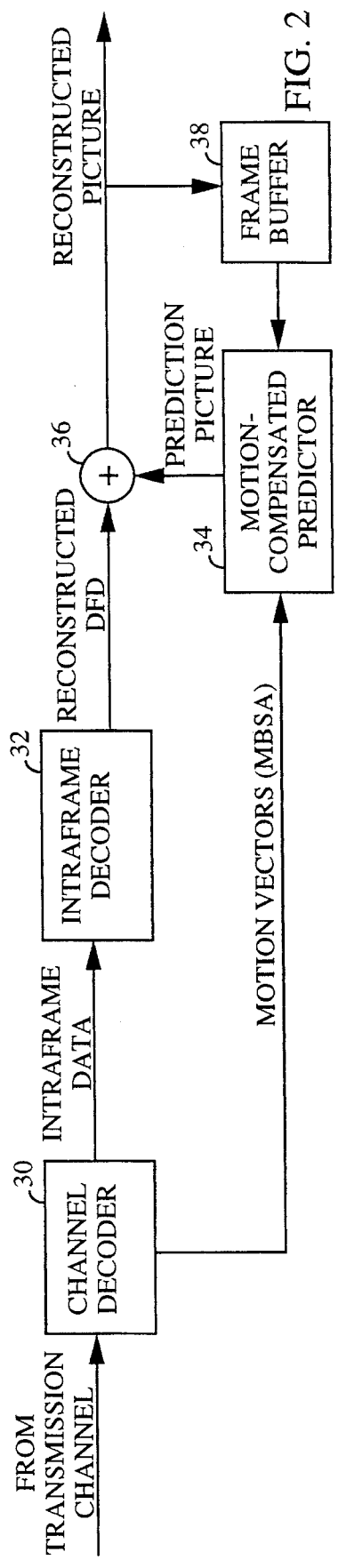

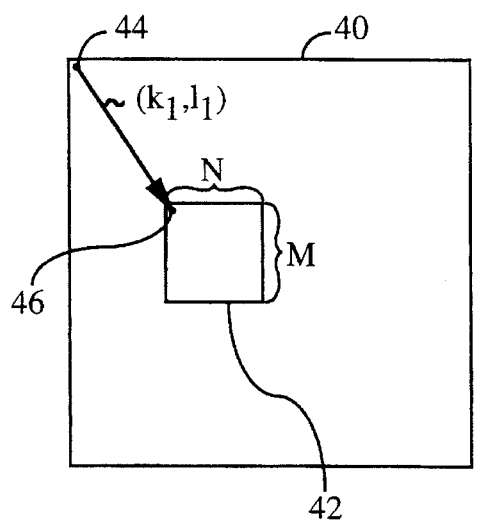
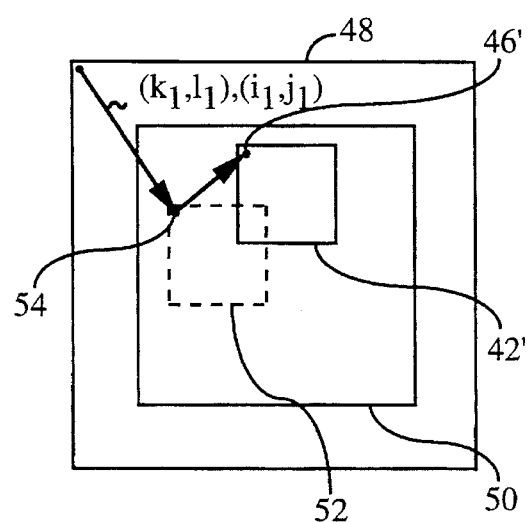
FIG. 3a                    FIG. 3b

INTERFRAME VIDEO ENCODING AND DECODING SYSTEM

This is a continuation of application Ser. No. 08/407,427, filed Mar. 17, 1995, abandoned which is a continuation of application Ser. No. 08/012,814 filed Feb. 3, 1993, now abandoned.

BACKGROUND OF THE INVENTION

I. Field of the Invention

The present invention relates to image processing. More particularly, the present invention relates to a novel and improved system and method for interframe video coding based upon motion compensated predictive discrete cosine transform coding techniques.

II. Description of the Related Art

In the field of transmission and reception of television signals, various improvements are being made to the NTSC (National Television Systems Committee) System. Developments in the field of television are commonly directed towards a high definition television (HDTV) system. In the early development of HDTV, system developers have merely applied the Nyquist sampling theorem and low-pass filter design with varying degrees of success. Modulation in these systems amounts to nothing more than a simple mapping of an analog quantity to a value of signal amplitude or frequency.

It has most recently been recognized that it is possible to achieve further improvements in HDTV systems by using digital techniques. Many of the early HDTV transmission proposals share common factors. These systems all involve digital processing of the video signal, which necessitates analog-to-digital (A/D) conversion of the video signal. An analog transmission format is then used thereby necessitating conversion of the digitally processed picture back to analog form for transmission.

The receiver/processor must then reverse the process in order to provide image display. The received analog signal is therefore digitized, stored, processed and reconstructed into a signal according to the interface format used between the receiver/processor and the HDTV display. Furthermore the signal is most likely converted back to analog form once more for display.

Many of the conversion operations mentioned above, however, may be avoided using a digital transmission format which transmits the processed picture, along with control, audio and authorization signals, using digital modulation techniques. The receiver may then be configured as a digital modem with digital outputs to the video processor function. Of course, the modem requires an A/D function as part of operation, but this implementation may only require a 4-bit resolution device rather than the 8-bit resolution device required by analog format receivers.

Digital transmission is superior to analog transmission in many ways. Digital transmissions provide efficient use of power which is particularly important to satellite transmission and military applications. Digital transmissions also provides a robustness of the communications link to impairments such as multipath and jamming. Furthermore digital transmission facilitates ease in signal encryption, necessary for many military and broadcast applications.

Digital transmission formats have been avoided in previous HDTV system proposals primarily because of the incorrect belief that they inherently require excessive bandwidth. Therefore in order to realize the benefits of digital transmission, it is necessary to substantially compress the HDTV signal. HDTV signal compression must therefore be achieved to a level that enables transmission at bandwidths comparable to that required by analog transmission formats. Such levels of signal compression coupled with digital transmission of the signal will enable a HDTV system to operate on less power with greater immunity to channel impairments.

Motion estimation/motion compensation techniques can be used to compress the amount of data required in the transmission of interframe coded motion video. Motion estimation/motion compensation processes exploit the high level of temporal redundancy in video data. This high level of temporal redundancy is a neccesary attribute of video data for the picture sequences to appear continuous. The process of estimating the motion of objects within a video sequence is known as motion estimation. The processing of images by compensating for the presence of motion in a scene or image is motion compensation. The combined processes of motion estimation and motion compensation produce a prediction of the current frame of data. The error in this prediction, known as the residual, can be further compressed and transmitted.

It is therefore an object of the present invention to provide a novel and improved method and system for compressing HDTV signals that will enable digital transmission at bandwidths comparable to that of analog transmission of conventional TV signals.

SUMMARY OF THE INVENTION

The present invention is a novel and improved system and method for compressing image data for transmission and for reconstruction of the image data upon reception. The image compression system includes a subsystem for generating a prediction of a block of input pixel data in the current frame of pixel data from a corresponding composite block pixel data from a reference frame of data optimized for encoding a high precision reproduction of said pixel data at a minimum transmission data rate.

In the present invention, novel techniques of motion estimation and motion compensation are employed. In standard motion estimation and motion compensation applications, a frame of data is divided into a fixed number of blocks of pixel data, and a prediction for each of the blocks of pixel data is calculated. The problem with using a fixed number of blocks is that using blocks that are too small results in a low level of compression and requires unacceptably high banwidth for transmission, and using blocks that are too large results in an unacceptably high level of picture degradation. In the present invention, however, the number and size of the blocks of pixel data varies in response to the amount of information in frame sequences. By employing this technique a high level of data compression can be achieved without picture degradation.

The sub-system of the present invention comprises first selection means for providing a first data prediction by selecting a most similar block of pixel data from a first reference block of data wherein the first reference block of data is a block of data from a previous frame or a combination of blocks of data from previous frames of data, and at least one additional selection means for providing additional predictions of the block of pixel data as combinations of predictions of smaller sub-blocks of pixel data by selecting sets of most similar sub-blocks of pixel data from additional reference blocks of data and wherein the additional reference blocks of data can be data from a previous frame or a combination of blocks of data from previous frames of data.

The decision means is included in the sub-system for selecting from the first data prediction and the additional data predictions an efficient prediction according to the similarity the current block of pixel data and the number of bits required to describe the efficient prediction and providing the efficient prediction as an output and a selection signal indicating the block size selection used in describing the efficient prediction.

The present invention also provides for a novel and improved method for reconstructing from a received encoded motion information value a corresponding block of pixel data. The present invention further envisions a novel and improved method for compressing an image signal as represented by a block of pixel data and for reconstructing the image signal from the compressed image signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 is a block diagram of an exemplary interframe encoder;

FIG. 2 is a block diagram of an exemplary interframe decoder;

FIGS. 3a and 3b are illustrations of pixel block space with a matching of pixel blocks between frames for the purpose of motion prediction;

FIG. 9 is a block diagram illustrating the processing elements in an exemplary adaptive block size motion compensated prediction element.

DETAILED DESCRIPTION OF THE PREFERRED EMBODIMENTS

Figure 4A:
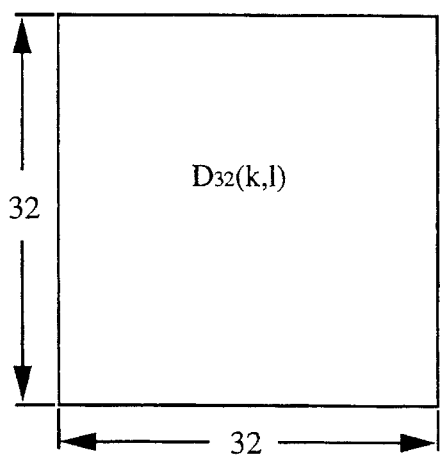
FIGS. 4a, 4b, 4c and 4d are exemplary illustrations of alternative motion prediction block sizes for a 32×32 block of pixel data.
Figure 4B:
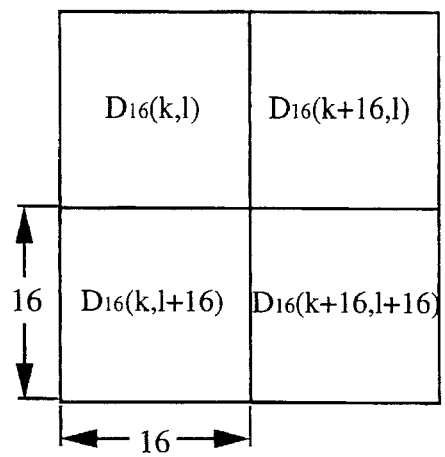
Figure 4C:
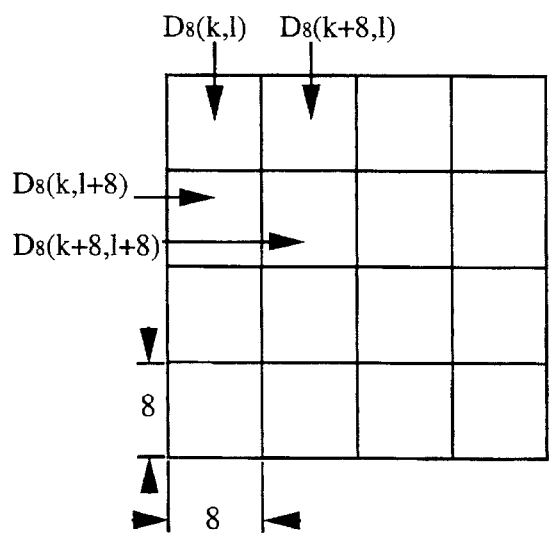
Figure 4D:
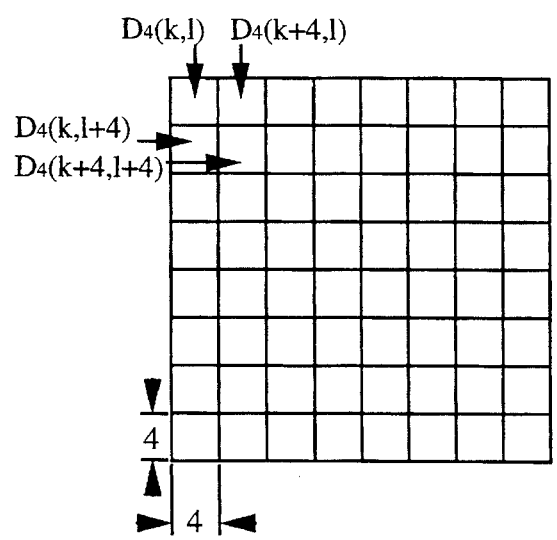

Turning now to the drawings, FIG. 1 illustrates in block diagram form an exemplary implementation of a general motion-compensated predictive coding (MPC) system. The coding system of FIG. 1 is comprised of intraframe encoder 10, channel encoder 12, intraframe decoder 14, frame buffer 16, motion-compensated prediction processor or predictor 18, motion estimation processor or estimator 20, and summers 22 and 24. It should be understood that the diagram of FIG. 1 is common to both conventional motion-compensated predictive coding systems and the present invention. However, in the present invention novel motion estimation and motion compensated prediction techniques are employed.

A sequence of input pictures comprised of pixel data is input to the coding system of FIG. 1. The pixel data may be provided as serial pixel data or in blocks, typically a 32×32 pixel block or smaller such as 16×16, 8×8, etc., is input to summer 22 and to motion estimator 20. Summer 22 subtracts from the input pixel data a corresponding prediction picture generated by motion-compensated predictor 18. The output of summer 22 is a displaced frame difference (DFD) data that is provided to intraframe encoder 10.

Intraframe encoder 10 encodes the DFD data using one of many possible intraframe compression techniques. Intraframe encoder 10 by way of example may be a block encoder which codes blocks of the DFD data. Should the DFD data be in serial form it is converted to block data for coding. An example of one type of intraframe decoder is the well known fixed block size discrete cosine transform (FBSDCT) coder. Another example of an intraframe coder which has improved performance over the FBSDCT coder is one using the adaptive block size discrete cosine transform (ABSDCT) techniques disclosed in U.S. Pat. Nos. 5,021,891 and 5,107,345, and even further using the ABSDCT technique in combination with a Discrete Quadtree Transform technique disclosed in copending U.S. patent application Ser. No. 07/710,216, filed Jun. 4, 1991 each assigned to the assignee of the present invention and the disclosure of which is incorporated by reference. Although ABSDCT coders are preferred, other types of intraframe encoders well known in the art may be readily substituted therefore. The intraframe coded data generated by intraframe encoder 10 is provided both to channel encoder 12 and intraframe decoder 14.

Channel encoder 12 is preferably used for encoding the intraframe coded data prior to transmission to protect the data from transmission channel induced errors. Channel encoder 12 typically uses conventional error correction encoding techniques. As such, encoder 12 may be a block, convolutional or trellis coder as is well known in the art. The encoded intraframe data along with motion vector data are encoded and provided for transmission by a transmitter (not shown).

The intraframe coded data provided to intraframe decoder 14 is decoded to produce a reconstructed DFD block. Intraframe decoder 14 is by its nature of a type which complements intraframe encoder 10. When intraframe encoder 10 is of the type mentioned in the above patents and patent application, the decoder is typically of the corresponding type as also described therein.

The reconstructed DFD block is provided from intraframe decoder 14 to summer 24 where it is added with a prediction picture generated by motion-compensated predictor 18 based upon a reference frame, typically the previous frame, of the input picture. The output of summer 24, which is a reconstructed picture, i.e. pixel block, is provided to frame buffer 16. Frame buffer 16 is thus updated by a reconstructed frame created by adding the reconstructed DFD that is produced by intraframe decoder 14 to the prediction picture. The reason for using the reconstructed DFD rather than the DFD is to keep frame buffer 16 and the frame buffer in the decoding system (FIG. 2) synchronized. In other words by using the reconstructed DFD the same picture is in both frame buffer 16 and the frame buffer in the decoding system (FIG. 2), since the DFD is not available to the decoding system.

The reconstructed picture stored in frame buffer 16 is provided to motion-compensated predictor 18 and motion estimator 20. Estimator 20 uses the reconstructed picture stored in frame buffer 16 and the input picture of the next frame to generate a set of motion vectors for the next input picture frame. Predictor 18 uses the reconstructed picture from the current frame stored in frame buffer 16 and the motion vectors generated in estimator 20 to produce a prediction for the next frame. The motion vectors from estimator 20 are also provided to channel encoder 12 for encoding and transmission along with the intraframe data for the next frame.

FIG. 2 illustrates in block diagram form an exemplary implementation of a motion-compensated predictive decoding system for decoding data encoded according to the encoding system of FIG. 1. The decoding system of FIG. 2 is comprised of channel decoder 30, intraframe decoder 32, motion-compensated predictor 34, summer 36 and frame buffer 38. A motion estimator is not needed in the decoding system since the motion vectors along with the interframe data is received from the encoding system. Thus the operation of the decoding system except for the channel decoder is a subset of the operations of the coding system of FIG. 1.

The signal received from the transmission channel receiver (not shown) is provided to channel decoder 30. Channel decoder 30 is of a type capable of decoding the data as encoded by channel encoder 12 of FIG. 1. Channel decoder 30 typically uses conventional decoding techniques and may be configured as a block, Viterbi or convolutional decoder as is well known in the art. The decoded data includes both intraframe data and motion vector data. The intraframe data is provided to intraframe decoder 32 while the motion vector data is provided to motion compensated predictor 34.

Intraframe decoder 32 produces from the intraframe data the reconstructed DFD which is provided to summer 36 along with a prediction picture generated by predictor 34. Intraframe decoder is preferably of the same type as intraframe decoder 14 of FIG. 1.

Summer 36 adds the reconstructed DFD to the prediction picture to produce a reconstructed picture. The current frame of the reconstructed picture is provided to frame buffer 38 where it is stored. The stored frame is provided to predictor 34 for use in generating the prediction picture for the next frame.

Returning to FIG. 1, in order to facilitate an understanding of the generation of the motion vectors of the present invention a description of conventional motion vector generation techniques is provided. The input picture is an image sequence, e.g., motion video, which can be represented by an intensity function I(x, y, t) where x and y are the spatial coordinates of the pixel and t is the frame number. Using this nomenclature the current frame to be encoded may be identified as I(x, y, t) and a reference frame may be identified as $I_R$(x, y, t).

A conventional motion estimator used in a conventional motion-compensated predictive coding system is based upon block matching. In the conventional motion estimator an N×M block of pixels for the current frame is used to search for a matching block in the reference frame, typically the previous frame (i.e. $I_R$(x, y, t)=I(x, y, t−1)). N and M may be of the same integer value to provide a square pixel block or may be of different values to provide a rectangular pixel block.

FIG. 3a illustrates for current pixel frame 40 a selected N×M pixel block 42. For reference purposes the (x, y) coordinates of the first pixel in the upper left hand corner of frame 40, pixel 44, is (0, 0). The (x, y) coordinate of the first pixel in the upper left hand corner of pixel block 42, pixel 46, is $(k_1, l_1)$ with this pixel having an intensity function of $I(k_1, l_1, t)$. The vector associated with the location of pixel block 42 within frame 40 is $(k_1, l_1)$.

A search for the best matching block in the reference frame is conducted over a search window within the reference frame. The "goodness" of the match is often measured by a block matching distortion function $F_{BMD}$(x, y) which for example may be a magnitude difference or squared error, e.g. $F_{BMD}$(x, y)=|x−y| or $F_{BMD}$(x, y)=(x−y)$^2$.

FIG. 3b illustrates the reference pixel frame 48 and a search window 50 over which the best match for pixel block 42' is to be searched. In FIG. 3b the position in reference frame 48 which the pixel block 42' occupied in the current frame is indicated in dotted lines by pixel block 52. The (x, y) coordinate of the first pixel in the upper left hand corner of pixel block 52, pixel 54, is $(k_1, l_1)$ having an intensity function of $I_R(k_1, l_1, t)$ A full-search block-matching motion estimator computes the distortion figure $D_{N,M}$:

$$D_{N,M}(k,l,i,j) = \sum_{n=0}^{N-1} \sum_{m=0}^{M-1} F_{BMD}(I(k+n, l+m, t), I_R(k+n+i, l+m+j, t)). \quad (1)$$

If $F_{BMD}$(x, y)=|x−y|, Equation 1 simplifies to the following:

$$D_{N,M}(k,l,i,j) = \sum_{n=0}^{N-1} \sum_{m=0}^{M-1} |I(k+n, l+m, t) - I_R(k+n+i, l+m+j, t)|. \quad (2)$$

The motion estimator further searches for the motion displacement (i, j) that minimizes $D_{N,M}$(k, l, i, j) to produce the minimum block distortion where:

$$D_{N,M}(k, l) = \text{MIN}\{D_{N,M}(k,l,i,j), i,j\} \text{ for all } (i,j) \in S, \quad (3)$$

where S is the search window.

From Equation 3 the displacement (i, j) that produces the minimum motion block distortion is called the motion vector (mx, my). The motion vector search range is often restricted to a maximum offset, typically −32≤mx, my≤32. It should be noted that mx and my need not be integer values. These values can be fractional numbers if a sub-pixel accuracy is used in motion estimation and compensation. It should be noted that extra processing, including interpolation, is required to produce non-integer pixels.

Using the above equations for the example illustrated in FIG. 3b, a pixel block 42' in the reference frame is identified as having the best match. The (x, y) coordinate of the first pixel in the upper left hand corner of pixel block 42', pixel 46', is $(k_1+i_1, l_1+j_1)$ having an intensity function of $I_R(k_1+i_1, l_1+j_1, t)$. The motion vector associated with the location of pixel block 42' with respect to pixel block 52 in the reference frame 48 is $(i_1, j_1)$.

Referring back to FIG. 1, motion estimator 20 differs from a conventional motion estimation processor in that more than one block size is used in the motion estimation. For convenience, let the motion block be an N×N square (ie. M=N so that $D_{N,M}$(k, l)=$D_N$(k, l)). In an exemplary configuration four motion block sizes are used, for example N=4, 8, 16 and 32. In the exemplary configuration, there will be one motion block distortion $D_{32}$(k, l) for the 32×32 base block, four motion block distortions for each of the four 16×16 blocks within that 32×32 block, sixteen distortions for each of the sixteen motion block distortions within the 32×32 block and sixty-four motion block distortions for each of the sixty-four 8×8 blocks within the 32×32 block.

Figure 5:
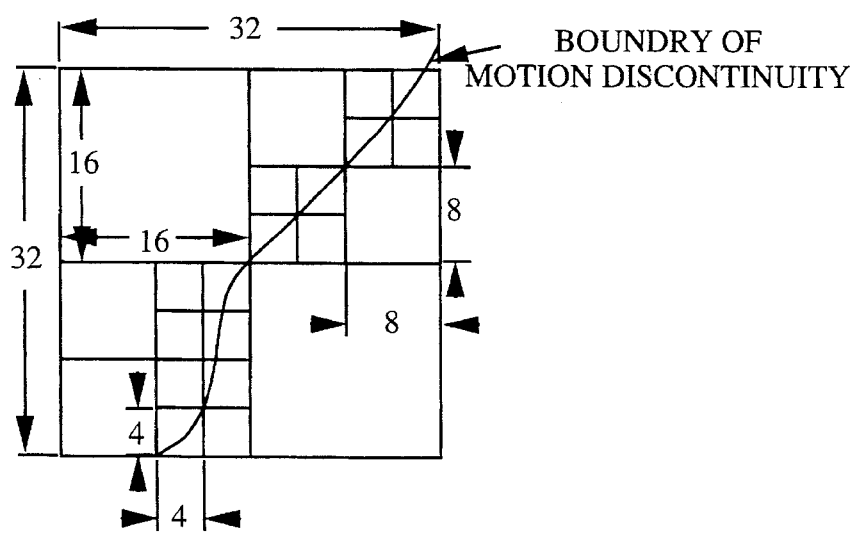
FIG. 5 is an exemplary illustration of a composite 32×32 block of predicted pixel data.

FIGS. 4a–4d, illustrate in an exemplary configuration, alternative block sizes used for motion estimation of the 32×32 block of pixel data. The block of pixel data in the current frame can be predicted by the selection of a single best match of a 32×32 block of pixel data from the reference frame as shown in FIG. 4a or alternatively can be predicted by selection from a reference frame of best match blocks in the form of four 16×16 sub-blocks of pixel data in FIG. 4b, sixteen sub-blocks of pixel data in FIG. 4c, or sixty-four sub-blocks of pixel data in FIG. 4d. Alternatively the block of pixel data can be predicted by a composite of 16×16, 8×8, and 4×4 blocks of pixel data from the reference frame as illustrated in FIG. 5.

In motion compensated prediction, predictions from the composite of smaller sub-blocks of pixel data will, in general, always result in a lower than or equal to distortion level than the distortion level resulting from predictions from a larger block. However, motion compensated predictions from smaller sub-blocks of pixel data, requires the transmission of more information, i.e. more motion vectors. The goal of an adaptive motion estimator 20 of FIG. 1 is to select smaller sub-block predictions only when it results in a significant improvement in local pixel reproduction quality. In a pixel area where a great amount of activity is present the predictions using the larger block sizes will result in unacceptably high levels of distortion. On the other hand, in areas where little or no activity is taking place the larger block sizes are acceptable and result in greater compression at little cost to picture quality.

Figure 6:
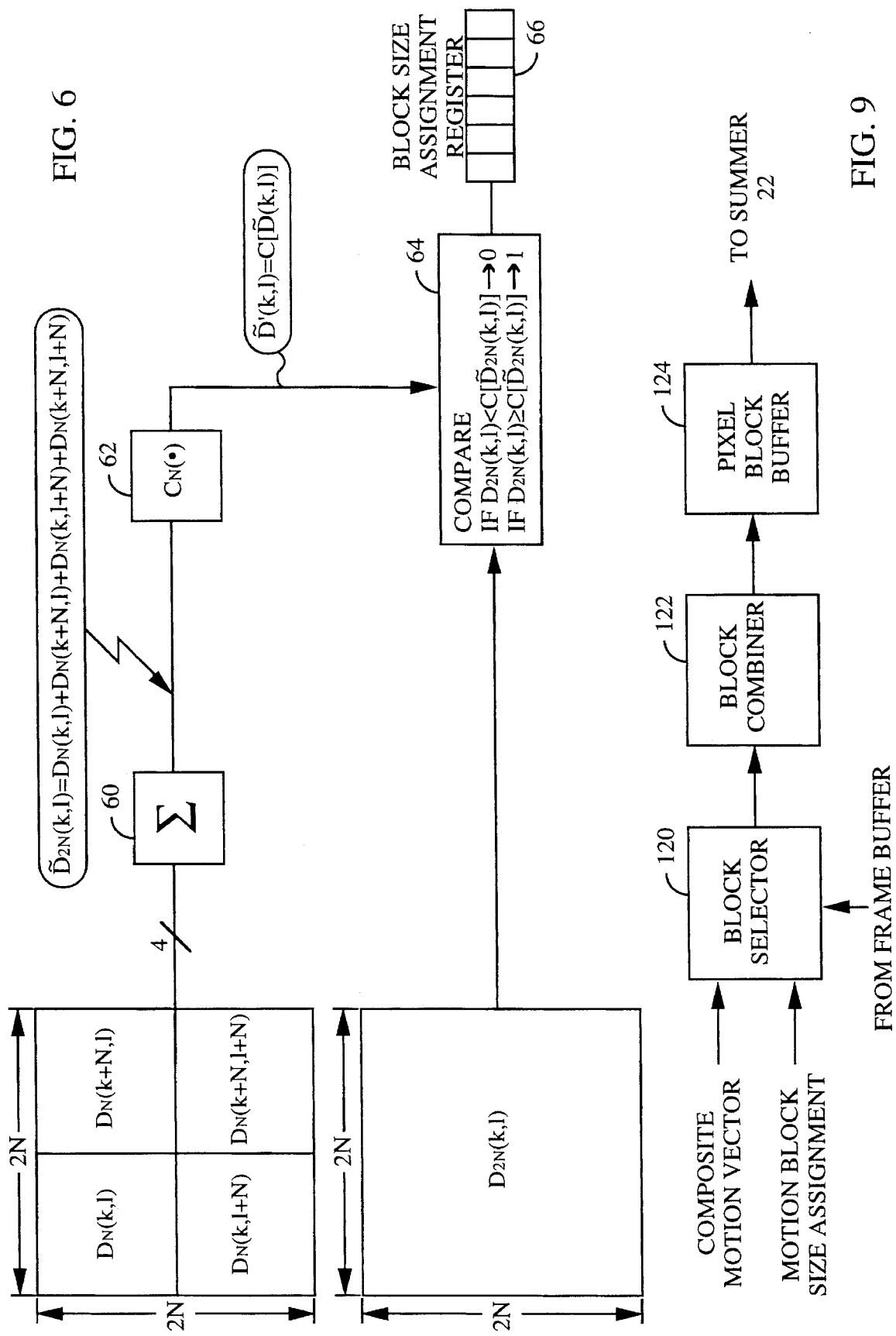
FIG. 6 is a simplified block diagram illustrating the processing elements in the block size assignment portion of an adaptive block size motion estimation element.

The adaptive block size motion estimation processor produces the composite motion block by choosing an optimum combination of large and small motion blocks that best describe the motion within the image block. This is to produce an improved motion compensated prediction such that the residual DFD (displaced frame difference) contains less signal energy and is therefore easier to encode using the subsequent spatial only compression (i.e. DCT or ABS-DCT). Referring to FIG. 6, this adaptive motion block size decision is performed in the following manner. Four neighboring motion block distortions $D_N(k,l)$, $D_N(k,l+N)$, $D_N(k+N,l)$ and $D_N(k+N,l+N)$ are grouped and summed to produce an alternative block distortion for the 2N×2N block that contains the four blocks. In FIG. 6, this summing occurs in block 60.

$$\tilde{D0}_{N,M}(k,l,i,j) = \sum_{n=0}^{1} \sum_{m=0}^{1} D_N(k+nN, l+mN) \quad (4)$$

If this distortion is significantly smaller than the distortion $D_{2N}(k,l)$, referring to the labeling scheme shown in FIG. 4, then the $D_{2N}(k,l)$ is replaced with $\tilde{D}_{2N}(k,l)$ and that decision is entered in a block assignment register. This indicates that the 2N×2N block may be more efficiently encoded by sending four N×N motion vectors. This process is repeated for all N×N motion blocks, before the process is applied to the resulting 2N×2N motion blocks. In the end, the process stops at the largest block size 32×32 in this example.

Although $\tilde{D}_{2N}(k,l)$ is likely to always be smaller or equal to $D_{2N}(k,l)$, there is a cost associated with using the smaller motion blocks. This can be factored into the decision using a cost function $C_N(\bullet)$ calculator 62. If $$\tilde{D}_{N,M}(k,l,i,j) < \sum_{n=0}^{1} \sum_{m=0}^{1} C_N(D_N(k+nN, l+mN)) \quad (5)$$

then use 2N×2N block size otherwise use 4 N×N blocks. In a simplified comparison format, $$D_{2N}(k,l) < C_N(\tilde{D}_{2N}(k,l)) \quad (6)$$

can be used. In the most simplistic form the cost function can be a scalar multiplication operation of the form $C_N(X) = \alpha_N X$, where the bias factor $\alpha_N > 1$.

Figure 7:
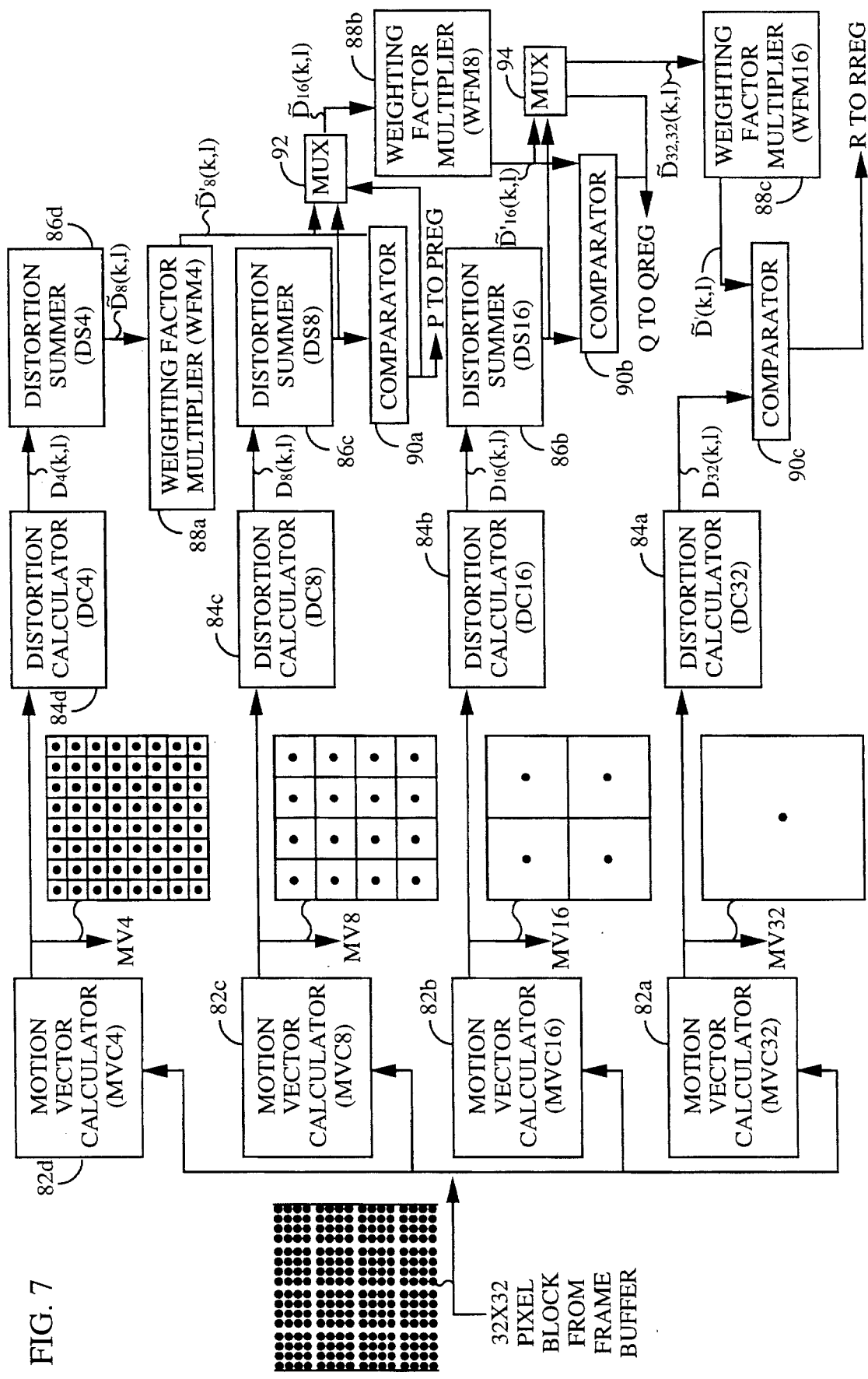
FIG. 7 and 8 are block diagrams illustrating the processing elements in an exemplary adaptive block size motion estimation element.

In FIG. 1, an image signal as represented by a 32×32 block of pixel data is received from the frame buffer (not shown). The pixel data may be either 8 bit black and white image data or 24 bit color image data. FIG. 7 illustrates the implementation of the motion estimation processor. The 32×32 pixel block is input to a 32×32 motion vector calculator element 82a. The 32×32 pixel block is also input as four 16×16 pixel blocks to 16×16 motion vector calculator element 82b, as sixteen 8×8 pixel blocks to 8×8 motion vector calculator element 82c, and as sixty-four 4×4 pixel blocks to 4×4 motion vector calculator element 82d.

Motion vector calculator elements 82a–82d select a best matched block of pixel data from a reference frame of pixel data and provide a motion vector corresponding to the location of the best matched block of pixel data within the search window of the reference frame. In the exemplary configuration, motion vector calculator element 82a selects a single 32×32 best match block of pixel data from the reference frame and provides a single motion vector, motion vector calculator element 82b compares the four 16×16 sub-blocks of pixel data in the 32×32 block of pixel data to 16×16 blocks of pixel data in the reference frame and accordingly provides four motion vectors, motion vector calculator element 82c compares the sixteen 8×8 sub-blocks of pixel data in the 32×32 block of pixel data to 8×8 blocks of pixel data in the reference frame and accordingly provides sixteen motion vectors, while motion vector calculator element 82d compares the sixty-four 4×4 sub-blocks of pixel data in the 32×32 block of pixel data to 4×4 blocks of pixel data from the reference frame and accordingly provides sixty-four motion vectors. Motion vectors are provided by motion vector calculators 82a–82d to respective distortion calculators 84a–84d.

Distortion calculators 84a–84d calculate a distortion quantity indicating "goodness" of the match the pixel data predictions. The distortion function can be a mean square error function or magnitude of the difference function. Other distortion functions are possible. The 32×32 distortion calculator 84a provides one distortion quantity $D_{32}(k,l)$. Whereas, for example, the 16×16 distortion calculator 84b provides four distortion quantities $D_{16}(k,l)$, $D_{16}(k+16,l)$, $D_{16}(k,l+16)$ and $D_{16}(k+16,l+16)$ corresponding to each of the matched pairs of blocks of pixel data. Similarly, the 8×8 distortion calculator 84c provides sixteen distortion quantities and the 4×4 distortion calculator 84d provides sixty-four distortion quantities.

The outputs of distortion calculators 84b–84d are respectively input to distortion summers 86b–86d. The distortion summers 86b–86d sum distortion values of adjacent sub-block predictions according to a grouping convention to provide alternative distortion values for larger blocks of pixel data. For example, the distortion in predictions of the four 4×4 sub-blocks of pixel data $D_4(k,l)$, $D_4(k+4,l)$, $D_4(k,l+4)$ and $D_4(k+4,l+4)$ are summed by distortion summer 86d to produce the alternative distortion value $\tilde{D}_8(k,l)$. This value corresponds to a single block $D_8(k,l)$ produced by distortion calculator 84c. The procedure of grouping and summing proceeds at all levels except the 32×32 prediction level. The 4×4 distortion summer 86d provides sixteen alternative distortion values of the form $\tilde{D}_8(x,y)$, the 8×8 distortion summer 86c provides four alternative distortion values of the form $\tilde{D}_{16}(x,y)$ and the 16×16 distortion summer 86b provides one alternative distortion value of the form $\tilde{D}_{32}(x,y)$.

The alternative distortion values are provided to weighting factor multipliers 88a, 88b and 88c. The cost of alternative distortion values are therein calculated according to a cost function to reflect the increase in number of bits associated with block predictions based on smaller blocks of pixel data. The weighting factor multipliers provide cost function adjusted alternative distortion values $\tilde{D}'_8(k,l)$, $\tilde{D}'_{16}(k,l)$ and $\tilde{D}'_{32}(k,l)$ to comparators 90a–90c. The comparators compare the prediction distortions to the cost function adjusted alternative distortion values and provide a selection signal of "0" or "1". If the cost function adjusted alternative distortion value is less than the larger block prediction distortion, a one is output by the comparator to signal the selection of the group of smaller predictions over the single prediction based on a larger block of pixel data from the reference frame. The values output from comparators 90a–90c are stored in block size assignment registers P, Q and R as motion block size assignment data.

Figure 8:
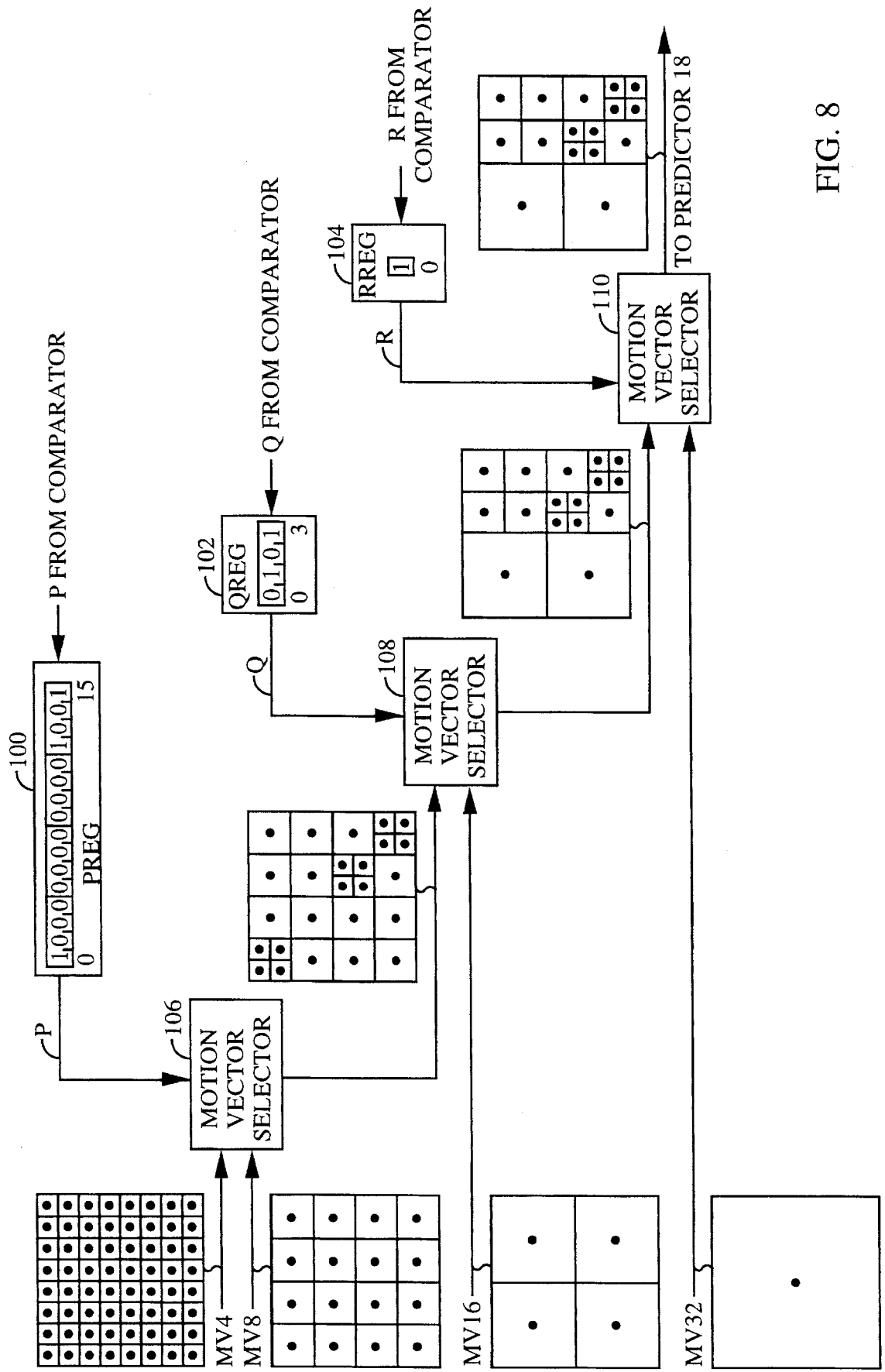

The motion estimator then combines the motion vectors of selected pixel prediction blocks into a composite motion vector block. In an exemplary implementation of the selected motion vectors combiner portion of the motion estimator, as illustrated in FIG. 8, the P value output from comparator 90a (FIG. 7) is input serially to a sixteen-bit register, P register 100. Similarly, the output from comparator 90b (FIG. 7) is input serially to a four-bit register, Q register 102. Finally, the output from comparator 90c (FIG. 7) is input serially to a one-bit register, R register 104. The output from P register 100 is provided as a P output to the select input of the motion vector selector 106. Motion vector selector 106, which may also be configured as a multiplexer, also has inputs as the MV4 and MV8 motion vector values respectively output from motion vector calculators 82d and 82c. The motion vector selector provides according to the block size assignment data a motion vector for the selected 8×8 prediction or a corresponding group of four motion vectors for each of the selected 4×4 predictions. The motion vector or vectors provided as output from motion vector selector 106 are provided as an input to motion vector selector 108, which also has as a second input for the MV16 motion vector values as output from motion vector calculator 82b. A select input to motion vector selector 108 is provided from the output of Q register 102. The ouput of Q register 102 determines whether the motion vector or vectors provided by motion vector selector 106 or the MV16, a 16×16 block motion vector provided by motion vector calculator 82b, is provided as output for motion vector selector 108. The output of motion vector selector 108 is coupled as one input to motion vector selector 110. The other input of motion vector selector 110 is coupled to the output of motion vector calculator 82a for receiving the value of motion vector MV32. The select input of multiplexer 110 is coupled to the output of R register 104 so as to receive the output bit R. Motion vector selector 110 provides the final step of selection wherein the output bit of the R register determines between providing the 32×32 block prediction vector MV32 or the output motion vectors of motion vector selector 108.

As illustrated in FIG. 8, the value of P register 100 bit is used to select via motion vector selector 106, 4×4 or 8×8 motion vectors of block prediction data. The selection of MV4 data comprising four motion vectors or the corresponding MV8 data comprising a single motion vector occurs at motion vector selector 106 in response to the value of the bit output from P register 100. Motion vector selector 108, in response to the value of the bit output from Q register 102 selects between the output of motion vector selector 106 and the MV16 data. When the Q register bit value is a "1" bit, the output of motion vectors from motion vector selector 106 is selected for output of motion vector selector 108. When the Q register bit value is a "0" bit, motion vector selector 108 selects the MV16 motion vector. Therefore, the output bit value of Q register 102 selects between motion vectors for four 8×8 block predictions or one motion vector for a single 16×16 block prediction. As illustrated in FIG. 8, the four upper left hand blocks selected as output from motion vector selector 106 include the motion vectors for four 4×4 block predictions with the motion vectors for three neighboring 8×8 block predictions. However with the bit of the Q register being a "0" bit, motion vector selector 108 selects the motion vector corresponding to a 16=16 block prediction as an output. This example illustrates the conditional replacement scheme.

The output of motion vector selector 108 is coupled as an input to motion vector selector 110. The other input of motion vector selector 110 is provided with the MV32 data, the 32×32 block of motion estimation vector MV32 as provided by motion vector calculator 82a. The select input to motion vector selector 110 is the output bit of the R register. In the example illustrated in FIG. 8, the bit output from R register 104 is a "1" bit thus selecting data as output from motion vector selector 110 which was provided from motion vector selector 108. Should the R register 104 output bit value be a "0" bit motion vector selector 110 would output the MV32 data.

The motion vector selector scheme as illustrated in FIG. 8 utilizes the block assignments to select motion vectors MV4, MV8, MV16, MV32 a composite motion vector. In essence this step is accomplished by three stages. The first stage conditionally replaces an 8×8 motion vector MV8 with four 4×4 MV4 motion vectors according to the content of the P register. The second stage conditionally replaces a 16×16 motion vector MV16 with ouput vectors from the previous stage according to the content of the P register. The third stage replaces the 32×32 motion vector MV32 with output vectors from the second stage if the R register contains a "1" bit. The composite motion vector is provided to the motion compensated predictor 18 (FIG. 1) along with the motion block size assignment data.

After all decisions are made, the motion block size assignment (MBSA) data in registers P, Q and R along with the corresponding motion vectors (ie. chosen from $m_{x4}(k, l)$, $m_{y4}(k, l)$, $m_{x8}(k, l)$, $m_{y8}(k, l)$, $m_{x16}(k, l)$, $m_{y16}(k, l)$, $m_{x32}(k, l)$ and $m_{y32}(k, l)$) are provided to the motion compensated predictor. The MBSA and the motion vectors are also provided to the channel encoder for encoding and transmission. The MBSA decision contained in the P, Q and R registers can be further compressed to fewer bits for transmission using variable length coding techniques or various other techniques.

The motion vectors in the composite motion block can also be compressed and encoded for transmission. This compression is possible because the motion vectors in the adjacent blocks tend to be highly correlated, except near motion discontinuities.

Given the composite motion vector block (CMV) above, the motion compensated predictor reads from the reference frame data stored in the frame buffer. The read address is generated by offsetting the current pixel address by the motion vector $(m_x, m_y)$, and responsive to the block size assignment data for selecting the size of the pixel block from the reference frame.

An exemplary implementation of the motion compensated predictor is illustrated in FIG. 9. The composite motion vector and the motion block assignment data are provided to the block selector 120. In response, to each of the motion vectors of the composite motion vector the block selector locates a block of pixel data from the reference frame of pixel data, and in response to the block size assignment data the block selector selects the size of the pixel block from the reference frame of data. The selected blocks of pixel data are provided to a block combiner 122 that orders the block of pixel data in the original frame format. The ordered pixel data is then presented to a pixel block buffer 124 that buffers the ordered pixel data so as to provide a complete frame of pixel data to summer 22 (FIG. 1).

Let (k, l) be the current pixel address of the current frame. In order to generate the prediction pixel I(k, l, t) from the reference frame $I_R(k, l, t)$ stored in the frame buffer, the address (k, l) is offset by $(m_x, m_y)$ that is given by the composite motion vector block.

$$\tilde{I}(k,l,t) = I_R(k+mx, l+my, t). \quad (7)$$

This predicted pixel data is provided to summer 22.

The predicted pixel data intensity function is subtracted from the input pixel data intensity function to provide the displaced frame difference (DFD) which is calculated by the equation:

$$DFD(x,y,t) = I(x,y,t) - \tilde{I}(x,y,t), \quad (8)$$

where $\tilde{I}(x, y, t)$ is the prediction picture generated by the motion compensated predictor as above.

The displaced frame difference (DFD) is encoded and transmitted along with the composite motion vector. The transmission of the DFD requires fewer bits than the original frame of data, because of its lower energy content. The transmission of the DFD information and the composite motion vector in place of the encoded frame of data represents a significant compression of data.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An interframe video compression system comprising:

a first motion predictor having an input for receiving a block of pixel data and having an output for providing a first image prediction;

a first distortion calculator having a first input for receiving said block of pixel data and having a second input for receiving said first image prediction and having an output for providing a first distortion value;

at least one additional motion predictor provided in parallel with said first motion predictor having an input for receiving said block of pixel data and having an output for providing additional image predictions;

a second distortion calculator having a first input for receiving said block of pixel data and having a second input for receiving said additional image predictions and having a first output for providing a second distortion value;

an encoding format selector having a first input coupled to said first distortion calculator output and having a second input coupled to said second distortion calculator output and having an output for providing a selected encoding format; and encoder having a first input coupled to said encoding format selector output and having an output for providing a selectively encoded residual frame, having a second input for receiving a first displaced frame difference generated in accordance with said first image prediction and having a third input for receiving a second displaced frame difference generated in accordance with said second image prediction and for selectively encoding said first displaced frame difference and said second displaced frame difference in accordance with said selected encoding format.

2. The system of claim 1 wherein said first motion predictor compares an N×N block of pixel data, where N is an integer, with N×N blocks of pixel data in a first reference block of data.

3. The system of claim 2 wherein said first motion predictor compares a 32×32 block of pixel data with 32×32 blocks of pixel data in a first reference block of data.

4. The system of claim 2 wherein said at least one additional motion predictor compares N/2×N/2 sub-blocks of pixel data with N/2×N/2 sub-blocks of data in said additional reference blocks of data.

5. The system of claim 1 wherein said first motion predictor has a second input for receiving a first reference block of data comprising pixel data from a previous frame of pixel data.

6. The system of claim 1 wherein said first motion predictor has a second input for receiving a combination block of data determined in accordance with previous frames of pixel data.

7. The system of claim 1 wherein said first motion predictor has a second output for providing a first motion vector.

8. The system of claim 1 wherein said at least one additional motion predictor has a second output for providing additional motion vectors.

9. The system of claim 1 further comprising a weighting value multiplier disposed between said first distortion calculator and said encoding format selector.

10. An interframe video compression system comprising:

first motion compensation means for receiving a block of video data and for comparing said block of video data with blocks of pixel data of a first block size to provide displaced frame difference (DFD) blocks, and for measuring distortion values for said DFD blocks, and for selecting a most similar block of pixel data of said first block size in accordance with said distortion values for said DFD blocks to provide a first motion vector, a first DFD block and a first distortion value;

additional motion compensation means for receiving said block of video data and for comparing said block of video data with a plurality blocks of pixel data of a second block size to provide second DFD blocks, and for measuring distortion values for said second DFD blocks, and for selecting a set of most similar block of pixel data of said second block size in accordance with said distortion values for said second DFD blocks to provide a set of additional motion vectors, a set of additional second DFD blocks, and a second distortion value;

decision means for comparing said first distortion value and said second distortion value and for selecting an encoding format in accordance with said comparison; and encoding means for selectively encoding said first motion vector and said first DFD block and said set of additional motion vectors and said second DFD blocks in accordance with said selected encoding format.

11. The system of claim 10 wherein said block of video data is an N×N block where N is an integer, and wherein said first block size is N×N.

12. The system of claim 11 wherein said block of video data is a 32×32 block and wherein first block size is 32×32.

13. The system of claim 11 wherein said second block size is N/2=N/2.

14. The system of claim 10 wherein said blocks of pixel data of a first block size comprise pixel data from a previous frame of pixel data.

15. The system of claim 10 wherein said blocks of pixel data of a first block size are combinations of pixel data from previous frames of pixel data.

16. The system of claim 10 wherein said decision means performs said comparison responsive to a weighting format.

17. The system of claim 10 further comprising a weighting means for receiving said additional distortion value by a predetermined weighting format.

18. An interframe video compression method for compressing a block of video data comprising the steps of:

comparing said block of video data with blocks of pixel data of a first block size to provide displaced frame difference (DFD) blocks;

measuring distortion values for said DFD blocks;

selecting a most similar block of pixel data of said first block size in accordance with said distortion values to provide a first motion vector, a first DFD block and a first distortion value;

comparing said block of video data with a plurality blocks of pixel data of a second block size to provide additional DFD blocks;

measuring distortion values for said DFD blocks;

selecting a set of most similar block of pixel data of said second block size in accordance with said distortion values for said additional DFD blocks to provide a set of additional motion vectors, a set of additional DFD blocks and a second distortion value;

selecting an encoding format in accordance with said first distortion value and said second distortion value; and selectively encoding said first motion vector and said first DFD block and said set of additional motion vectors and said set of additional DFD blocks in accordance with said selected encoding format.

19. The method of claim 18 wherein said block of video data is an N×N block, where N is an integer, and wherein said first block size is N×N.

20. The method of claim 19 wherein said block of video data is a 32×32 block and wherein first block size is 32×32.

21. The method of claim 19 wherein said second block size is N/2×N/2.

22. The method of claim 18 wherein said blocks of pixel data of a first block size comprise pixel data from a previous frame of video data.

23. The method of claim 18 wherein said blocks of pixel data of a first block size are combinations of blocks of data from previous frames of video data.

24. The method of claim 18 further comprising the step of weighting said additional distortion value by a predetermined weighting format.

* * * * *